(12) United States Patent
Fujimoto et al.

(10) Patent No.: US 9,534,158 B2
(45) Date of Patent: Jan. 3, 2017

(54) CURABLE COMPOSITION

(75) Inventors: Toyohisa Fujimoto, Takasago (JP); Toshihiko Okamoto, Takasago (JP)

(73) Assignee: KANEKA CORPORATION, Osaka (JP)

( * ) Notice: Subject to any disclaimer, the term of this patent is extended or adjusted under 35 U.S.C. 154(b) by 461 days.

(21) Appl. No.: 14/002,573

(22) PCT Filed: Feb. 22, 2012

(86) PCT No.: PCT/JP2012/054181
§ 371 (c)(1),
(2), (4) Date: Nov. 6, 2013

(87) PCT Pub. No.: WO2012/117902
PCT Pub. Date: Sep. 7, 2012

(65) Prior Publication Data
US 2014/0094553 A1 Apr. 3, 2014

(30) Foreign Application Priority Data
Mar. 2, 2011 (JP) .................... 2011-045374

(51) Int. Cl.
| | | |
|---|---|---|
| *C09J 201/10* | (2006.01) | |
| *C08L 101/10* | (2006.01) | |
| *C08G 65/336* | (2006.01) | |
| *C09J 171/02* | (2006.01) | |
| *C08G 65/26* | (2006.01) | |

(52) U.S. Cl.
CPC .......... *C09J 171/02* (2013.01); *C08G 65/2663* (2013.01); *C08G 65/336* (2013.01); *C08L 101/10* (2013.01); *C09J 201/10* (2013.01); *C08L 2205/02* (2013.01)

(58) Field of Classification Search
CPC ...... C09J 201/10; C08L 101/10; C08G 65/336
USPC ................................. 524/500, 425
See application file for complete search history.

(56) References Cited

U.S. PATENT DOCUMENTS

| | | | |
|---|---|---|---|
| 6,280,562 B1 | 8/2001 | Nishikawa et al. | |
| 7,182,833 B2 * | 2/2007 | Ando | C08G 65/336 156/329 |
| 2008/0234426 A1 * | 9/2008 | Kotani | C08F 8/42 524/588 |
| 2010/0216925 A1 | 8/2010 | Yano | |

FOREIGN PATENT DOCUMENTS

| | | |
|---|---|---|
| JP | 03-263478 A | 11/1991 |
| JP | 04-57850 A | 2/1992 |
| JP | 10-251552 A | 9/1998 |
| JP | 2001-22568 A | 1/2001 |
| JP | 2001-220568 A | 8/2001 |
| JP | 2003-313418 A | 11/2003 |
| JP | 2004-224985 A | 8/2004 |
| JP | 2007-154009 A | 6/2007 |
| JP | 2007-231086 A | 9/2007 |
| JP | 2010-150381 A | 7/2010 |
| JP | 2011-127004 A | 6/2011 |
| JP | 2011-178955 A | 9/2011 |
| WO | 2009/011329 A1 | 1/2009 |

OTHER PUBLICATIONS

International Preliminary Report on Patentability of International Application No. PCT/JP2012/054181, Forms PCT/IB/373 and PCT/ISA/237.
International Search Report dated May 29, 2012, issued in corresponding application No. PCT/JP2012/054181.

\* cited by examiner

*Primary Examiner* — Ling Choi
*Assistant Examiner* — Thuy-Ai Nguyen
(74) *Attorney, Agent, or Firm* — Westerman, Hattori, Daniels & Adrian, LLP

(57) ABSTRACT

The present invention provides a curable composition useful as a contact adhesive which has a high rate of initial tack development, high tack strength, and long retention time of the developed tack. The curable composition includes an organic polymer (Q) containing a reactive silyl group, and a linear organic polymer (P) having a number average molecular weight larger than that of the polymer (Q) and having a reactive silyl group containing three hydrolyzable groups at only one terminal. The organic polymer (P) and the organic polymer (Q) are mixed at a mixing ratio (P):(Q), in terms of parts by weight, of 60:40 to 5:95.

15 Claims, No Drawings

CURABLE COMPOSITION

TECHNICAL FIELD

The present invention relates to at least one organic polymer containing a silicon-containing group that contains a hydroxyl or hydrolyzable group bonded to a silicon atom and can form a siloxane bond to be cross-linked (hereinafter, such a silicon-containing group is referred to also as a "reactive silyl group"), and to a curable composition including the organic polymer, which is useful as a contact adhesive.

BACKGROUND ART

A contact adhesive utilizes initial tack to attach adherends. The initial tack occurs when the adhesive is applied to both surfaces of an adherend and the adhesive is left to stand for a predetermined period of time (after an open time). Contact adhesives have been long used in practice because they eliminate the need for temporary tacking or temporary holding, i.e., they are user friendly, and have an excellent balance of other physical properties. Contact adhesives, however, are solvent adhesives obtained by dissolving a polymer (e.g. natural rubber, synthetic rubber) in an organic solvent (to a solids concentration of 20 to 35%), and therefore have problems relating to labor environment, disaster prevention, and public hazard.

In order to solve these problems, aqueous emulsion adhesives have been considered, but they, currently, do not show satisfactory performance because they have problems such as low initial adhesion and a very long drying time particularly in winter.

Meanwhile, solventless contact adhesives containing a reactive silyl group-containing organic polymer (modified silicone polymer) which are considered to show performance equivalent to that of conventional solvent adhesives have been developed. Patent Literature 1, for example, discloses an adhesive including a modified silicone polymer and a (meth)acrylate copolymer with a reactive silyl group. This adhesive unfortunately takes a long time to develop its tack, showing performance which is not sufficiently satisfactory as an alternative for the current solvent contact adhesives. Patent Literatures 2 and 3 each disclose a contact adhesive containing a polymer with a trialkoxysilyl group, a polymer with a dialkoxysilyl group, and a (meth)acrylate copolymer. The trialkoxysilyl group is present at both terminals of the polymer in the adhesives described in these Patent Literatures. Such a polymer causes the adhesive to have too high a crosslink density during curing to reduce the initial stickiness, that is, the adhesive cannot achieve sufficiently high tack strength. The polymer with a trialkoxysilyl group at both terminals also causes immediate curing of only the surface of the adhesive after application (causes formation of a skin), which leads to a working life not long enough.

CITATION LIST

Patent Literature

Patent Literature 1: JP H03-263478 A
Patent Literature 2: JP H10-251552 A
Patent Literature 3: JP 2001-220568 A

SUMMARY OF INVENTION

Technical Problem

The present invention aims to provide a curable composition useful as a contact adhesive which has a high rate of initial tack development, high tack strength, and long retention time of the developed tack.

Solution to Problem

The present inventor has made intensive studies to solve the above problems, and has found that organic polymers having a specific molecular weight and a specific number of reactive silyl groups, when used in combination, develop initial tack useful for a contact adhesive. Thereby, the present invention has been completed.

That is, the present invention relates to the following items (1) to (13).

(1) A curable composition including
a linear organic polymer (P) having a reactive silyl group represented by the following formula (1) at only one terminal, and
an organic polymer (Q) containing a reactive silyl group represented by the following formula (2),
the organic polymer (P) and the organic polymer (Q) being mixed at a mixing ratio (P):(Q), in terms of parts by weight, of 60:40 to 5:95,
the organic polymer (P) having a number average molecular weight larger than that of the organic polymer (Q),
the formula (1) being:

$$-V-SiX_3 \qquad (1)$$

wherein V represents a C1 to C8 divalent hydrocarbon group, Xs each represent a hydroxyl or hydrolyzable group, and when there are a plurality of Xs, Xs may be the same as or different from one another,
the formula (2) being:

$$-V-SiR^1_d X_{3-d} \qquad (2)$$

wherein $R^1$ represents a C1 to C20 hydrocarbon group, a C6 to C20 aryl group, a C7 to C20 aralkyl group, or a triorganosiloxy group represented by $R^0_3SiO-$ where the three $R^0$s each represent a C1 to C20 hydrocarbon group and may be the same as or different from one another; V represents a C1 to C8 divalent hydrocarbon group; X represents a hydroxyl or hydrolyzable group; d represents 1 or 2; when there are a plurality of $R^1$s, $R^1$s may be the same as or different from one another; and when there are a plurality of Xs, Xs may be the same as or different from one another.

(2) The curable composition according to item (1), wherein a backbone structure of the organic polymer (P) is a polyoxypropylene polymer.

(3) The curable composition according to item (1) or (2), wherein a backbone structure of the organic polymer (Q) is a polyoxypropylene polymer.

(4) The curable composition according to any one of items (1) to (3),
wherein the organic polymer (P) has a number average molecular weight of 10000 or more.

(5) The curable composition according to any one of items (1) to (4),
wherein the organic polymer (Q) has a number average molecular weight of 20000 or less.

(6) The curable composition according to any one of items (1) to (5),
wherein the organic polymer (Q) has 1.4 or more reactive silyl groups per molecule on average.
(7) The curable composition according to any one of items (1) to (6), further including a (meth)acrylic acid alkyl ester (co)polymer (R).
(8) The curable composition according to any one of items (1) to (7), including an amine compound as a curing catalyst (H).
(9) The curable composition according to any one of items (1) to (8), including a tin compound as a curing catalyst (H) in an amount of 2 parts by weight or less for each 100 parts by weight in total of the polymers (P) and (Q).
(10) The curable composition according to item (9),
wherein the tin curing catalyst (H) is at least one of dibutyltin dilaurate and dioctyltin dilaurate.
(11) The curable composition according to any one of items (1) to (10), including at least one of silica and calcium carbonate as a filler (F).
(12) The curable composition according to any one of items (2) to (11),
wherein the organic polymer (P) having a polyoxypropylene polymer backbone structure is formed from a polyoxypropylene polymer polymerized using an initiator that has one hydroxyl group per molecule.
(13) A contact adhesive including the curable composition according to any one of items (1) to (12) as a component.

Advantageous Effects of Invention

The curable composition of the present invention including the reactive silyl group-containing organic polymer (P) and the reactive silyl group-containing organic polymer (Q) shows characteristic initial tack useful for contact adhesives.

DESCRIPTION OF EMBODIMENTS

Hereinafter, the present invention is described in detail.
(Reactive Silyl Group-Containing Organic Polymer (P))
The reactive silyl group-containing organic polymer (P) in the present invention is not particularly limited if it is a linear organic polymer having a reactive silyl group represented by the following formula (1) at only one terminal.

$$-V-SiX_3 \qquad (1)$$

In the formula, V represents a C1 to C8 divalent hydrocarbon group, Xs each represent a hydroxyl group or hydrolyzable group, and when there are a plurality of Xs, Xs may be the same as or different from each other.
(Reactive Silyl Group in Formula (1))
Xs in formula (1) each represent a hydroxyl group or hydrolyzable group. Examples of the hydrolyzable group include, but not particularly limited to, known hydrolyzable groups such as hydrogen atoms, halogen atoms, alkoxy groups, acyloxy groups, ketoxymate groups, amino groups, amide groups, acid amide groups, aminooxy groups, mercapto groups, and alkenyloxy groups. Among these, hydrogen atoms, alkoxy groups, acyloxy groups, ketoxymate groups, amino groups, amide groups, aminooxy groups, mercapto groups, and alkenyloxy groups are preferred, alkoxy groups (e.g. methoxy groups, ethoxy groups) are more preferred for moderate hydrolysis and easy handling, and methoxy groups and ethoxy groups are particularly preferred.

(Backbone Structure of Reactive Silyl Group-Containing Organic Polymer (P))
The backbone structure of the reactive silyl group-containing organic polymer (P) of the present invention is not particularly limited as long as it is not a (meth)acrylic acid alkyl ester (co)polymer, and various backbone structures are possible.
Specific examples of the backbone structure include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene with isoprene or a like monomer, polychloroprene, polyisoprene, copolymers of isoprene or butadiene with at least one of acrylonitrile, styrene and a like monomer, polybutadiene, and copolymers of isoprene or butadiene with acrylonitrile, styrene or a like monomer, and hydrogenated polyolefin polymers derived from hydrogenation of these polyolefin polymers; polyester polymers obtained by condensation of a dibasic acid such as adipic acid and a glycol, and obtained by ring-opening polymerization of lactones; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of ε-aminoundecanoic acid, nylon 12 produced by ring-opening polymerization of ε-aminolaurolactam, and copolymer nylons containing multiple kinds of components of the aforementioned nylons; polycarbonate polymers produced by polycondensation of bisphenol A and carbonyl chloride, and diallyl phthalate polymers.
Preferable among these are saturated hydrocarbon polymers such as polyisobutylene, hydrogenated polyisoprene, and hydrogenated polybutadiene, and polyoxyalkylene polymers. This is because these polymers have a relatively low glass transition temperature, and give high initial tack strength. The glass transition temperature of the reactive silyl group-containing organic polymer (P) in the present invention is not particularly limited, but is preferably 20° C. or lower, more preferably 0° C. or lower, and particularly preferably −20° C. or lower. The glass transition temperature values are measured by DSC.
Also, polyoxyalkylene polymers are particularly preferred because they have high moisture permeability, and show excellent depth curability and excellent adhesion when used for a one-pack composition.
Among these, polyoxyalkylene polymers are most preferred.
Polyoxyalkylene polymers contain a repeating unit of —$R^6$—O— (wherein $R^6$ is a C1 to C14 linear or branched alkylene group), and $R^6$ is preferably a C2 to C4 linear or branched alkylene group. Specific examples of the repeating unit of —$R^6$—O— include —$CH_2$O—, —$CH_2CH_2$O—, —$CH_2CH(CH_3)$O—, —$CH_2CH(C_2H_5)$O—, —$CH_2C(CH_3)(CH_3)$O—, and —$CH_2CH_2CH_2CH_2$O—. The backbone structure of a polyoxyalkylene polymer may be formed from one repeating unit, or may include multiple repeating units. Particularly in applications such as sealants and adhesives, the backbone structure is preferably formed from a polyoxypropylene polymer including oxypropylene repeating units in an amount of 50% by weight or more, preferably 80% by weight or more, of the total polymer backbone structure because it is then amorphous and relatively low in viscosity.

The backbone structure of the organic polymer is required to be linear. A linear structure causes the molecular chains to be tangled more, achieving an effect of increasing the initial tack.

The polyoxyalkylene polymers are preferably obtained by ring-opening polymerization reaction of a cyclic ether compound in the presence of an initiator and a polymerization catalyst.

Examples of the cyclic ether compound include ethylene oxide, propylene oxide, butylene oxide, tetramethylene oxide, and tetrahydrofuran. These cyclic ether compounds may be used alone or in combination. Among these cyclic ether compounds, propyleneoxide is particularly preferred because an amorphous polyether polymer having relatively low viscosity can be obtained.

Specific examples of the initiator include alcohols such as ethylene glycol, propylene glycol, butanediol, hexamethylene glycol, neopentyl glycol, diethylene glycol, dipropylene glycol, triethylene glycol, allyl alcohol, methanol, ethanol, propanol, butanol, pentanol, and hexanol; and polyoxyalkylene polymers having a number average molecular weight of 300 to 4000, such as polyoxypropylene diol, polyoxyethylenediol, polyoxypropylene monool, and polyoxyethylene monool. Among these, an initiator having one hydroxyl group per molecule is preferred in terms of the easiness in synthesis for introducing a reactive silyl group at only one terminal at a subsequent step.

Examples of the method for synthesizing a polyoxyalkylene polymer include, but not particularly limited to, a polymerization method with an alkali catalyst such as KOH; a polymerization method with a transition metal compound-porphyrin complex catalyst, such as a complex produced by the reaction between an organoaluminum compound and porphyrin, as disclosed in JP S61-215623 A; polymerization methods with a double metal cyanide complex catalyst, as disclosed in JP S46-27250 B, S59-15336 B, U.S. Pat. Nos. 3,278,457 A, 3,278,458 A, 3,278,459 A, 3,427,256 A, 3,427,334 A and 3,427,335 A, and other documents; a polymerization method with a catalyst containing a polyphosphazene salt, as disclosed in JP H10-273512 A; and a polymerization method with a catalyst containing a phosphazene compound, as disclosed in JP H11-060722 A. In terms of the production cost and production of a polymer with a low molecular weight distribution, a polymerization method with a double metal cyanide complex catalyst is more preferred.

As the backbone structure of the reactive silyl group-containing organic polymer (P) in the present invention, a polyoxyalkylene polymer containing another bond such as a urethane bond or urea bond may be used as long as the effect of the present invention is not greatly reduced. Specific examples of such a polymer include polyurethane prepolymers.

Polyurethane prepolymers are obtainable by a known method such as a method of reacting a polyol compound and a polyisocyanate compound.

Specific examples of the polyol compound include polyether polyol, polyester polyol, polycarbonate polyol, and polyether polyester polyol.

Specific examples of the polyisocyanate compound include diphenylmethane diisocyanate, tolylene diisocyanate, xylylene diisocyanate, methylene-bis(cyclohexyl isocyanate), isophorone diisocyanate, and hexamethylene diisocyanate.

The polyurethane prepolymers may terminally have either a hydroxyl group or an isocyanato group.

A cured article obtained from a curable composition including a polymer with at least one of a urethane bond, a urea bond, and an ester bond in the backbone structure as the reactive silyl group-containing organic polymer (P) in the present invention may have significantly reduced strength due to possible cleavage of the backbone at the at least one of a urethane bond, a urea bond, and an ester bond by heat or the like.

If many amide bonds ($-NR^7-C(=O)-$; $R^7$ represents a hydrogen atom or a substituted or unsubstituted organic group) are present in the backbone skeleton of the reactive silyl group-containing organic polymer (P) in the present invention, the viscosity of the polymer is likely to increase. Also, the viscosity may increase after storage, which possibly decreases the workability of the resulting composition. Furthermore, the amide bond may be cleaved under heat.

Accordingly, if the backbone structure contains an amide bond, the backbone structure has 1 to 10, preferably 1.5 to 5, and more preferably 2 to 3 amide bonds per molecule on average. If the backbone structure has less than 1 amide bond, the curability may not be sufficient. If the backbone structure has more than 10 amide bonds, the polymer may have high viscosity to be not easily handled.

For these reasons, the backbone structure of the reactive silyl group-containing organic polymer (P) in the present invention is most preferably a polyoxyalkylene polymer without a urethane bond, a urea bond, an ester bond, and an amide bond, in terms of production of a curable composition with excellent storage stability and workability.

(Reactive Silyl Group-Containing Organic Polymer (P))

The reactive silyl group-containing organic polymer (P) in the present invention is preferably produced by at least one of the following methods (a) and (b).

(a) A method of producing a polyoxyalkylene polymer, including converting a terminal hydroxyl group of a hydroxy-terminated polyoxyalkylene polymer into an allyl group, and reacting the polymer with $HSiX_3$ (wherein X is the same as defined in formula (1)). Alternatively, the method of producing a reactive silyl group-containing polyoxyalkylene polymer, further including, after reacting the polymer with a silane compound represented by $HSiX_3$ (wherein X is the same as defined in formula (1)), reacting the polymer with an alcohol compound or the like in the presence of a catalyst, thereby converting the hydrolyzable group.

(b) A method of producing a polyoxyalkylene polymer, including reacting a terminal hydroxyl group of a hydroxy-terminated polyoxyalkylene polymer with an isocyanatomethyl silane compound represented by $OCN-CH_2-SiX_3$ (wherein X is the same as defined in formula (1)).

Also, if a polyurethane prepolymer is used, the method is (b1) a method of producing a reactive silyl group-containing polyurethane prepolymer, including reacting each terminal functional group (e.g. hydroxyl, isocyanato, amino) of at least one polyurethane prepolymer selected from the group consisting of a hydroxy-terminated polyurethane prepolymer, an isocyanato-terminated polyurethane prepolymer, and an amino-terminated polyurethane prepolymer with an isocyanatomethyl silane compound represented by $OCN-CH_2-SiX_3$ (wherein X is the same as defined in formula (1)).

Among these methods, the method (a) is preferred because the polymer obtained by the method (a) has lower viscosity than a reactive silyl group-containing organic polymer obtained by the method (b) or (b1). The method (b) is preferred in terms of achieving a high conversion ratio in a relatively short reaction time.

Introduction of a reactive silyl group by the method (a) can be performed by the methods described in JP S45-36319

B, JP S46-12154 B, JP S50-156599 A, JP S54-6096 A, JP S55-13767 A, JP S55-13468 A, JP S57-164123 A, JP H3-2450 B, U.S. Pat. Nos. 3,632,557 A, 4,345,053 A, 4,366,307 A, and 4,960,844 A, the methods of introducing a reactive silyl group into a polyoxypropylene polymer having a number average molecular weight of 6000 or more, a large molecular weight with an Mw/Mn of 1.6 or lower, and a low molecular weight distribution through hydrosilylation as described in JP S61-197631 A, JP S61-215622 A, JP S61-215623 A, JP S61-218632 A, WO 2007/040143 A, and JP 2008-285585 A, or the method described in JP H3-72527 A.

The reactive silyl group-containing organic polymer (P) preferably has a molecular weight distribution (Mw/Mn) of 1.6 or lower, more preferably 1.5 or lower, and particularly preferably 1.4 or lower.

The reactive silyl group-containing organic polymer (P) preferably has a polystyrene-equivalent number average molecular weight (Mn), measured by gel permeation chromatography (GPC), of 22000 to 100000, and more preferably 25000 to 50000. A larger molecular weight of the reactive silyl group-containing organic polymer (P) results in a higher rate of initial tack development and higher strength thereof. A molecular weight of 10000 or more achieves these effects significantly. Meanwhile, a molecular weight of 100000 or more is likely to provide too high viscosity, causing difficulties in handling.

The reactive silyl group is required to be at only one terminal of a linear organic polymer. If the curable composition contains an organic polymer having a reactive silyl group represented by formula (1) at both terminals, the surface of the adhesive is immediately cured (forms a skin) in initial stage of curing, leading to a loss of the initial tack. The curable composition preferably includes only 5% by weight or less, more preferably only 1% by weight or less, and preferably substantially 0% by weight, of the organic polymer having a reactive silyl group represented by formula (1) at both terminals.

The organic polymer (P) is required to have 0.5 to 1.0 reactive silyl groups per molecule on average. If the organic polymer (P) has less than 0.5 reactive silyl groups, the strength of the resulting cured article tends to be low, causing insufficient adhesion strength. The organic polymer (P) more preferably has 0.6 to 1.0, still more preferably 0.7 to 1.0, and most preferably 0.8 to 1.0 reactive silyl groups. Here, the average number of reactive silyl groups in the reactive silyl group-containing organic polymer (P) in the present invention is defined as an average number calculated by determining the number of protons on carbons to which reactive silyl groups are directly bonded, by high resolution $^1$H-NMR. The calculation of the average number of reactive silyl groups in the reactive silyl group-containing organic polymer (P) in the present invention is performed as follows. After the introduction of the reactive silyl group into an organic polymer precursor into which the reactive silyl group is to be introduced, if there are the organic polymer precursor not having the reactive silyl group introduced, and/or modified organic polymer precursors (by-products) not having the reactive silyl group introduced, such organic polymer precursor and by-products are included in the parameter (number of molecules), as a part of members of the reactive silyl group-containing organic polymer (P) having the same backbone structure, to calculate the average number of reactive silyl groups per molecule.
(Reactive Silyl Group-Containing Organic Polymer (Q))

The reactive silyl group-containing organic polymer (Q) in the present invention may be any organic polymer having a reactive silyl group represented by the following formula (2) at a terminal of the molecular chain.

$$—V—SiR^1_dX_{3-d} \quad (2)$$

In the formula, $R^1$ represents a C1 to C20 hydrocarbon group, a C6 to C20 aryl group, a C7 to C20 aralkyl group, or a triorganosiloxy group represented by $R^0_3SiO—$, where the three $R^0$s each represent a C1 to C20 hydrocarbon group and may be the same as or different from one another; V represents a C1 to C8 divalent hydrocarbon group; X represents a hydroxyl group or a hydrolyzable group; d represents 1 or 2; when there are a plurality of $R^1$s, $R^1$s may be the same as or different from one another; and when there are a plurality of Xs, Xs may be the same as or different from one another.
(Reactive Silyl Group of Formula (2))

X in formula (2) represents a hydroxyl group or a hydrolyzable group. The hydrolyzable group may be any known hydrolyzable group, such as the ones mentioned for the above formula (1). In terms of moderate hydrolysis and easy handling, alkoxy groups such as methoxy and ethoxy are more preferred, and methoxy and ethoxy are particularly preferred. The number of Xs is affected by the design of the present invention where the organic polymer (P) only is reacted to exhibit tack in the initial stage of curing, and then the organic polymer (Q) is reacted to secure the final adhesion strength. Here, if there are three Xs (if d in formula (2) is 0), the organic polymer (Q) and the organic polymer (P) are reacted simultaneously, and thus the above effects are not likely to be achieved. For this reason, the number of Xs is preferably 1 or 2, and most preferably 2, in terms of curability, storage stability, and favorable rubber elasticity of the resulting cured article.

Examples of $R^1$ in formula (2) include, but not particularly limited to, alkyl groups such as methyl and ethyl; cycloalkyl groups such as cyclohexy; aryl groups such as phenyl; and aralkyl groups such as benzyl. Among these, methyl is particularly preferred.

Specific examples of the linking group V in formula (2) include divalent linking groups such as hydrocarbon groups (e.g. —$CH_2$—, —$CH_2CH_2$—, —$CH_2CH_2CH_2$—, and —$CH_2CH_2CH_2CH_2$—).

Specific examples of the group represented by —$SiR^1_dX_{3-d}$ in formula (2) include dimethoxymethylsilyl groups, diethoxymethylsilyl groups, diisopropoxymethylsilyl groups, methoxydimethylsilyl groups, and ethoxydimethylsilyl groups. Particularly, dimethoxymethylsilyl groups are preferred because they give a different reactivity from that of the organic polymer (P) and thus achieve favorable initial tack.
(Backbone Structure of Reactive Silyl Group-Containing Organic Polymer (Q))

The backbone structure of the reactive silyl group-containing organic polymer (Q) in the present invention is not particularly limited, and may be the same as the backbone structure of the reactive silyl group-containing organic polymer (P). Particularly, a backbone structure derived from at least one of polyoxypropylene diol and polyoxypropylene triol is preferred, and a backbone structure derived from polyoxypropylene diol is more preferred.
(Reactive Silyl Group-Containing Organic Polymer (Q))

The reactive silyl group-containing organic polymer (Q) in the present invention is preferably produced by the following method (c).

(c) A method of producing a reactive silyl group-containing polyoxyalkylene polymer, including converting the terminal hydroxyl group of a hydroxy-terminated polyoxyalkylene polymer into an allyl group, and reacting the polymer with a silane compound represented by $HSiR^1_dX_{3-d}$ (wherein $R^1$, X, and d are the same as defined in formula (2)).

The reactive silyl group-containing organic polymer (Q) preferably has a molecular weight distribution (Mw/Mn) of 1.6 or lower, more preferably 1.5 or lower, and particularly preferably 1.4 or lower.

The reactive silyl group-containing organic polymer (Q) may consist of one species, or may include multiple species.

The reactive silyl group-containing organic polymer (Q) preferably has a polystyrene equivalent number average molecular weight, measured by GPC, of 3000 to 100000, more preferably 5000 to 50000, particularly preferably 8000 to 35000, and most preferably 10000 to 20000.

To obtain a favorable rubbery cured article, the reactive silyl group-containing organic polymer (Q) preferably has 1.0 to 3.0, more preferably 1.2 to 2.5, and most preferably 1.4 to 2.0 of reactive silyl groups per molecule on average. Less than 1.0 reactive silyl group per molecule is likely to cause insufficient curability, not giving favorable rubber elasticity.

The backbone structure of the reactive silyl group-containing organic polymer (Q) preferably has a linear structure or a branched structure with 1 to 6 branches, more preferably a linear structure or a branched structure with 1 or 2 branches, and particularly preferably a linear structure or a branched structure with 1 branch. Too large a number of terminals to which the reactive silyl group is bonded per molecule are likely to increase the crosslink density, making it difficult to achieve favorable rubber elasticity.

The reactive silyl group may be located at a terminal of the backbone or a side chain of the organic polymer molecule, or at both terminals. Particularly in the case that the reactive silyl group is located at a terminal of the backbone of the molecule, the molecular weight between crosslinking points is larger. This case is preferred because a rubbery cured article having high strength, high elongation, and low elastic modulus is likely to be provided.

The mixing ratio of the reactive silyl group-containing organic polymer (P) to the reactive silyl group-containing organic polymer (Q), i.e., (P):(Q), is required to be 60:40 to 5:95 (parts by weight), and is preferably 40:60 to 10:90 (parts by weight). A proportion of the reactive silyl group-containing organic polymer (P) of more than 60 parts by weight tends to cause insufficient curing, leading to low final adhesion strength. A proportion of less than 5 parts by weight is less likely to achieve the initial tack.

When comparing the molecular weights of the reactive silyl group-containing organic polymer (P) and the reactive silyl group-containing organic polymer (Q), the molecular weight of the reactive silyl group-containing organic polymer (P) needs to be larger than that of the reactive silyl group-containing organic polymer (Q). The polymer (P) is reacted in the initial stage of curing, serving to develop tack. At this time, a larger molecular weight is preferred because the rate of tack development and the tack strength tend to be high. Meanwhile, the polymer (Q) serves to decrease the viscosity of the composition, and increase the final strength of the adhesive by being cured after the polymer (P) is cured.

For this reason, the molecular weight of the polymer (Q) is required to be smaller than that of the polymer (P). Also, the polymer (Q) preferably has a small molecular weight because the crosslink density of the resulting rubber elastomer tends to be high and the strength as an adhesive tends to be high. The molecular weight of the polymer (Q) is preferably smaller than that of the polymer (P) by 5000 or more.

The curable composition of the present invention preferably includes a curing catalyst (H) for promoting the reaction of crosslinking through hydrolysis condensation of the reactive silyl groups in the reactive silyl group-containing organic polymer (P) and the reactive silyl group-containing organic polymer (Q).

Examples of the condensation catalyst include, but not particularly limited to, known catalysts. Particularly in the case of using a small amount of an amine compound, dibutyltin dilaurate, dioctyltin dilaurate, or another tin compound as a curing catalyst, the reaction time of the reactive silyl group-containing organic polymer (P) represented by formula (1) and the reaction time of the reactive silyl group-containing organic polymer (Q) represented by formula (2) are likely to be different. That is, the polymer (P) reacts in a very short time whereas the polymer (Q) slowly reacts over a long period of time. For this reason, in the case that only the polymer (P) reacts in the initial stage of curing to develop tack quickly and for a long time and the polymer (Q) reacts after a time lag, the composition can eventually achieve sufficiently high strength as an adhesive.

Examples of the amine compound usable as the curing catalyst include, but not particularly limited to, aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine and oleylamine; aromatic amines such as aniline, laurylaniline, stearylaniline, and triphenylamine; nitrogen-containing heterocyclic compounds such as pyridine, 2-aminopyridine, 2-(dimethylamino)pyridine, 4-(dimethylamino pyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo(5,4,0)undecene-7 (DBU), 6-(dibutylamino)-1,8-diazabicyclo(5,4,0)undecene-7 (DBA-DBU), 1,5-diazabicyclo(4,3,0)nonene-5 (DBN), 1,4-diazabicyclo (2,2,2)octane (DABCO), and aziridine; and other amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperazinyl)ethylamine, xylylenediamine, and 2,4,6-tris(dimethylaminomethyl)phenol; guanidines such as guanidine, phenylguanidine, and diphenylguanidine; and biguanides such as butylbiguanide, 1-o-tolylbiguanide, and 1-phenylbiguanide.

Among these, amidines such as 1,2-dimethyl-1,4,5,6-tetrahydropyrimidine, DBU, DBA-DBU, and DBN; guanidines such as guanidine, phenylguanidine, and diphenylguanidine; and biguanides such as butylbiguanide, 1-o- tolylbiguanide, and 1-phenylbiguanide are preferred because they have high activity. Aryl-substituted biguanides such as 1-o-tolylbiguanide and 1-phenylbiguanide are preferred because high adhesion can be expected.

Amine compounds are basic. Amine compounds whose conjugate acids have a pKa of 11 or higher have high catalytic activity and are thus preferred. Amine compounds such as 1,2-dimethyl-1,4,5,6-tetrahydropyrimidine, DBU, and DBN are particularly preferred because their conjugate acids have a pKa of 12 or higher, and thus they have high catalytic activity.

Also, ketimine compounds, producing the amine compounds by hydrolysis, can be used as a curing catalyst.

In the case of using an amine compound as a curing catalyst, the amount is preferably 0.01 to 20 parts by weight, more preferably 0.1 to 15 parts by weight, and particularly preferably 0.5 to 10 parts by weight, for each 100 parts by weight in total of the reactive silyl group-containing organic polymer (P) and the reactive silyl group-containing organic polymer (Q). An amount of the condensation catalyst of less than 0.01 parts by weight can give an insufficient curing rate, and may not allow sufficient progress of the curing reaction. An amount of the condensation catalyst of more than 20 parts by weight leads to too high a curing rate to shorten the working life of the curable composition, which tends to deteriorate the workability and storage stability.

Examples of the tin compound usable as the curing catalyst in the present invention include dibutyltin dilaurate, dioctyltin dilaurate, dibutyltin maleate, dibutyltin phthalate, dibutyltin dioctate, dibutyltin diethylhexanolate, dibutyltin dimethylmaleate, dibutyltin diethylmaleate, dibutyltin dibutylmaleate, dibutyltin dioctylmaleate, dibutyltin ditridecylmaleate, dibutyltin dibenzylmaleate, dibutyltin diacetate, dioctyltin diethylmaleate, dioctyltin dioctylmaleate, dibutyltin dimethoxide, dibutyltin dinonylphenoxide, dibutenyltin oxide, dibutyltin diacetylacetonate, dibutyltin diethylacetoacetonate, a reaction product of dibutyltin oxide and a silicate compound, a reaction product of dibutyltin oxide and phthalic acid ester, tin octylate, and tin neodecanoate.

In the case of using a tin compound as a curing catalyst, dibutyltin dilaurate and dioctyltin dilaurate are preferred. Use of these compounds as a catalyst tends to cause a difference in the curing reaction rate between the organic polymer (P) and the organic polymer (Q), enabling achievement of favorable tack for a long period of time in the initial stage of curing. In the case of using a tin compound other than the above compounds, the amount thereof is required to be 2 parts by weight or less for each 100 parts by weight in total of the reactive silyl group-containing organic polymer (P) and the reactive silyl group-containing organic polymer (Q). An amount of more than 2 parts by weight is not likely to cause a difference in the curing reaction rate between the organic polymer (P) and the organic polymer (Q), and thus the organic polymer (Q) reacts soon after the reaction of the organic polymer (P). Hence, the time of tack development tends to be short. A more preferred amount of the tin compound when used as a curing catalyst is 1 part by weight or less and 0.01 parts by weight or more, and more preferably 0.5 parts by weight or less and 0.1 parts by weight or more, for each 100 parts by weight in total of the reactive silyl group-containing organic polymer (P) and the reactive silyl group-containing organic polymer (Q).

Known condensation catalysts other than the above amine compounds and tin compounds can be used in the present invention. For example, carboxylic acids mentioned below can be used: linear saturated fatty acids such as acetic acid, propionic acid, butyric acid, valeric acid, caproic acid, enanthic acid, caprylic acid, pelargonic acid, capric acid, undecanoic acid, lauric acid, tridecyl acid, myristic acid, pentadecyl acid, palmitic acid, heptadecyl acid, stearic acid, nonadecanoic acid, arachic acid, behenic acid, lignoceric acid, cerotic acid, montanic acid, melissic acid, and lacceric acid; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyene unsaturated fatty acids such as linoelaidic acid, linolic acid, 10,12-octadecadienoic acid, hiragonic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, steeridonic acid, arachidonic acid, 8,12,16,19-docosatetraenoic acid, 4,8,12,15,18-eicosapentaenoic acid, clupanodonic acid, nisinic acid, and docosahexaenoic acid; branched fatty acids such as 2-methylbutyric acid, isobutyric acid, 2-ethylbutyric acid, pivalic acid, 2,2-dimethylbutyric acid, 2-ethyl-2-methylbutyric acid, 2,2-diethylbutyric acid, 2-phenylbutyric acid, isovaleric acid, 2,2-dimethylvaleric acid, 2-ethyl-2-methylvaleric acid, 2,2-diethylvaleric acid, 2-ethylhexanoic acid, 2,2-dimethylhexanoic acid, 2,2-diethylhexanoic acid, 2,2-dimethyloctanoic acid, 2-ethyl-2,5-dimethylhexanoic acid, versatic acid, neodecanoic acid, and tuberculostearic acid; fatty acids with triple bonds, such as propiolic acid, tariric acid, stearolic acid, crepenynic acid, ximenynic acid, and 7-hexadecynoic acid; alicyclic carboxylic acids such as naphthenic acid, malvalic acid, sterculic acid, hydnocarpic acid, chaulmoogric acid, gorlic acid, 1-methylcyclopentanecarboxylic acid, 1-methylcyclohexanecarboxylic acid, 1-adamantanecarboxylic acid, bicyclo[2.2.2]octane-1-carboxylic acid, and bicyclo[2.2.1]heptane-1-carboxylic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, 2,2-dimethyl-3-hydroxypropionate, ricinoleic acid, camlolenic acid, licanic acid, pheronic acid, and cerebronic acid; and halogen-substituted products of monocarboxylic acids such as chloroacetic acid, 2-chloroacrylic acid, and chlorobenzoic acid. Examples of an aliphatic dicarboxylic acid include saturated dicarboxylic acids such as acyclic dicarboxylic acids (e.g. adipic acid, azelaic acid, pimelic acid, suberic acid, sebacic acid, glutaric acid, oxalic acid, malonic acid, ethylmalonic acid, dimethyl malonic acid, ethyl methyl malonic acid, diethyl malonic acid, succinic acid, 2,2-dimethylsuccinic acid, 2,2-diethylsuccinic acid, 2,2-dimethylglutaric acid), saturated carboxylic acids such as 1,2,2-trimethyl-1,3-cyclopentanedicarboxylic acid and oxydiacetic acid; and unsaturated dicarboxylic acids such as maleic acid, fumaric acid, acetylenedicarboxylic acid, and itaconic acid. Examples of an aliphatic polycarboxylic acid include acyclic tricarboxylic acids such as aconitic acid, citric acid, isocitric acid, 3-methylisocitric acid, and 4,4-dimethylaconitic acid. Examples of an aromatic carboxylic acid include aromatic monocarboxylic acids such as benzoic acid, 9-anthracene carboxylic acid, atrolactic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid. Other examples of the catalyst include amino acids such as alanine, leucine, threonine, aspartic acid, glutamic acid, arginine, cysteine, methionine, phenylalanine, tryptophan, and histidine; and carboxylic acid derivatives producing carboxylic acids by hydrolysis, such as carboxylic acid anhydrides, esters, amides, nitriles, and acyl chlorides.

The carboxylic acid used as a curing catalyst is preferably 2-ethylhexanoic acid, octylic acid, neodecanoic acid, oleic acid, or naphthenic acid, for easy availability, inexpensiveness, and favorable compatibility with the reactive silyl group-containing organic polymer (P) and the reactive silyl group-containing organic polymer (Q).

Also, the following metal compounds can be used as a curing catalyst: titanium compounds such as tetrabutyl titanate, tetrapropyl titanate, titanium tetra(acetylacetonate), and diisopropoxytitanium bis(acetylacetonate); organic aluminum compounds such as aluminum tris(acetylacetonato), aluminum tris(ethylacetoacetate), and diisopropoxyaluminum ethylacetoacetate; and zirconium compounds such as zirconium tetra(acetylacetonate).

The curing catalyst may be a combination of multiple different catalysts.

The curable composition of the present invention preferably includes a (meth)acrylic acid alkyl ester (co)polymer (R) (hereinafter, also referred to as a "(co)polymer (R)"), for better initial tack and higher adhesion.

The (meth)acrylic acid alkyl ester (co)polymer refers to a polymer with repeating units of a single (meth)acrylic acid alkyl ester compound, a copolymer with repeating units of multiple (meth)acrylic acid alkyl ester compounds, and a copolymer with repeating units of a single or multiple (meth)acrylic acid alkyl ester compounds and a compound copolymerizable therewith. The expression "(meth)acrylic acid alkyl ester" refers to at least one of an acrylic acid alkyl ester and a methacrylic acid alkyl ester, and the same applies hereinafter.

Examples of the (meth)acrylic acid alkyl ester compound to be used as a repeating unit include, but not particularly limited to, conventionally known ones such as methyl acrylate, ethyl acrylate, n-propyl acrylate, n-butyl acrylate, isobutyl acrylate, tert-butyl acrylate, n-hexyl acrylate, 2-ethylhexyl acrylate, decyl acrylate, undecyl acrylate, lauryl acrylate, tridecyl acrylate, myristyl acrylate, cetyl acrylate, stearyl acrylate, behenyl acrylate, and biphenyl acrylate.

Also, examples of the methacrylic acid ester compound include, but not particularly limited to, conventionally known compounds such as methyl methacrylate, ethyl methacrylate, n-propyl methacrylate, n-butyl methacrylate, isobutyl methacrylate, tert-butyl methacrylate, n-hexyl methacrylate, 2-ethylhexyl methacrylate, decyl methacrylate, undecyl methacrylate, lauryl methacrylate, tridecyl methacrylate, myristyl methacrylate, cetyl methacrylate, stearyl methacrylate, behenyl methacrylate, and biphenyl methacrylate.

The backbone skeleton of the (meth)acrylic acid alkyl ester (co)polymer (R) is substantially formed from a single or multiple (meth)acrylic acid alkyl ester compounds. Here, "substantially formed from the above compound" means that the repeating units derived from the (meth)acrylic acid alkyl ester compound constitute more than 50% of the (co)polymer (R). The proportion of the repeating units derived from the (meth)acrylic acid alkyl ester compound in the (co)polymer (R) is preferably 70% or higher.

Among the (meth)acrylic acid alkyl ester compounds, preferred is a copolymer with molecular chains substantially formed from a (meth)acrylic acid alkyl ester compound (r-1) containing a C1 to C8 alkyl group, and a (meth)acrylic acid alkyl ester compound (r-2) containing a C10 or higher alkyl group (hereinafter, such a copolymer is also referred to as a "(co)polymer (R)-a"), in terms of the compatibility and stability.

The (meth)acrylic acid alkyl ester compound (r-1) containing a C1 to C8 alkyl group for the (co)polymer (R)-a is represented by formula (3):

$$CH_2=C(R^2)COOR^3 \qquad (3)$$

wherein $R^2$ represents a hydrogen atom or a methyl group, and $R^3$ represents a C1 to C8 alkyl group.

Examples of $R^3$ in formula (3) include, but not particularly limited to, C1 to C8 alkyl groups such as a methyl group, an ethyl group, a propyl group, an n-butyl group, a t-butyl group, and a 2-ethylhexyl group. $R^3$ is preferably C1 to C4, and more preferably C1 or C2 alkyl groups.

$R^3$ in the (co)polymer (R)-a is not particularly limited to one kind of alkyl group.

The (meth)acrylic acid alkyl ester compound (r-2) containing a C10 or higher alkyl group for the (co)polymer (R)-a is represented by formula (4):

$$CH_2=C(R^2)COOR^4 \qquad (4)$$

wherein $R^2$ is the same as defined in formula (3), and $R^4$ represents a C10 or more alkyl group.

Examples of $R^4$ in formula (4) include, but not particularly limited to, long-chain alkyl groups having 10 or more carbon atoms (typically 10 to 30 carbon atoms) such as a lauryl group, a tridecyl group, a cetyl group, a stearyl group, a C22 alkyl group, and a behenyl group. $R^4$ is preferably a long-chain alkyl group having 10 to 20 carbon atoms. $R^4$ in the (co)polymer (R)-a is not particularly limited to one kind of alkyl group.

The molecular chains of the (co)polymer (R)-a are substantially formed from the compounds (r-1) and (r-2). Here, "substantially formed from the above compounds (r-1) and (r-2)" means that the repeating units derived from the compounds (r-1) and (r-2) constitute more than 50% of the (co)polymer (R)-a.

The proportion of the repeating units derived from the compounds (r-1) and (r-2) in the (co)polymer (R)-a is preferably 70% or higher. A proportion of the repeating units derived from the compounds (r-1) and (r-2) in the (co) polymer (R)-a of lower than 50% is likely to decrease the compatibility between the reactive silyl group-containing organic polymers (P) and (Q) and the (co)polymer (R)-a to make the mixture cloudy, which tends to decrease the adhesion of the cured article.

The ratio by weight between the repeating units derived from the compounds (r-1) and (r-2) in the (co)polymer (R)-a ((r-1)-derived compound:(r-2)-derived compound) is preferably 95:5 to 40:60, and more preferably 90:10 to 60:40. A ratio of more than 95:5 tends to decrease the compatibility, whereas a ratio of less than 40:60 tends to bring disadvantages in cost.

Also, the (co)polymer (R) including the repeating units derived from the (meth)acrylic acid alkyl ester compounds may further include repeating units derived from a compound that is copolymerizable with the above compounds. Examples of the compound copolymerizable with the (meth) acrylic acid alkyl ester compounds include, but not particularly limited to, acrylic acids such as acrylic acid and methacrylic acid; amido group-containing compounds such as acrylamide, methacrylamide, N-methylolacrylamide, and N-methylolmethacrylamide; epoxy group-containing compounds such as glycidyl acrylate and glycidyl methacrylate; amino group-containing compounds such as diethylaminoethyl acrylate, diethylaminoethyl methacrylate, and aminoethyl vinyl ether; and other compounds derived from acrylonitrile, styrene, α-methylstyrene, alkyl vinyl ether, vinyl chloride, vinyl acetate, vinyl propionate, or ethylene.

The (co)polymer (R) may have any molecular weight, but preferably has a polystyrene equivalent number average molecular weight, measured by GPC, of 500 to 100000, more preferably 1000 to 50000, and particularly preferably 2000 to 20000, in terms of easy workability and excellent tack.

Examples of the method of producing the (co)polymer (R) include, but not particularly limited to, a common vinyl polymerization method such as solution polymerization or bulk polymerization through radical reaction. The reaction is typically performed in the presence of the above compound, a radical initiator, a chain transfer agent, and a solvent at 50 to 150° C.

Examples of the radical initiator include azobisisobutyronitrile and benzoyl peroxide. Examples of the chain transfer agent include mercaptans such as n-dodecyl mercaptan, t-dodecyl mercaptan, and lauryl mercaptan, and halogen-containing compounds. Examples of the solvent include nonreactive solvents such as ethers, hydrocarbons, and esters.

The (co)polymer (R) preferably has a reactive silyl group represented by the following formula (5), for excellent adhesion strength and heat resistance of the resulting cured article:

$$—V—SiR^1_e X_{3-e} \quad (5)$$

wherein $R^1$ and X are the same as defined in formula (2); V represents a C1 to C8 divalent hydrocarbon group; e represents 0, 1, or 2; when there are a plurality of $R^1$s, $R^1$s may be the same as or different from one another; and when there are a plurality of Xs, Xs may be the same as or different from one another.

Examples of the method of introducing a reactive silyl group into the (co)polymer (R) include, but not particularly limited to, the following various methods:

(i) a method of copolymerizing a compound containing a polymerizable unsaturated bond and a reactive silyl group with the compounds (r-1) and (r-2);

(ii) a method of copolymerizing a compound containing a polymerizable unsaturated bond and a reactive functional group (hereinafter, referred to as a Y' group) (e.g. acrylic acid) with the compounds (r-1) and (r-2), and reacting the resulting copolymer with a compound containing reactive silyl group and a functional group (hereinafter referred to as a Y" group) that can react with the Y' group (e.g. compound containing an isocyanato group and the group: —Si(OCH$_3$)$_3$);

(iii) a method of copolymerizing the compounds (r-1) and (r-2) in the presence of a mercaptan containing a reactive silyl group as a chain transfer agent;

(iv) a method of copolymerizing the compounds (r-1) and (r-2) in the presence of an azobisnitrile compound with a reactive silyl group or a disulfide compound with a reactive silyl group as an initiator; and (v) a method of polymerizing the compounds (r-1) and (r-2) by living radical polymerization to introduce a reactive silyl group at a molecular terminal.

Also, the methods (i) to (v) can be used in any combination. For example, the methods (i) and (iii) may be combined to copolymerize a compound containing a polymerizable unsaturated bond and a reactive silyl group with the compounds (r-1) and (r-2), in the presence of a mercaptan containing a reactive silyl group as a chain transfer agent.

Examples of the compound containing a polymerizable unsaturated bond and a reactive silyl group in the method (i) include, but not particularly limited to, γ-methacryloxypropylalkylpolyalkoxysilanes such as γ-methacryloxypropyltrimethoxysilane, γ-methacryloxypropylmethyldimethoxysilane, and γ-methacryloxypropyltriethoxysilane; γ-acryloxypropylalkylpolyalkoxysilanes such as γ-acryloxypropyltrimethoxysilane, γ-acryloxypropylmethyldimethoxysilane, and γ-acryloxypropyltriethoxysilane; and vinylalkylpolyalkoxysilanes such as vinyltrimetoxysilane, vinylmethyldimethoxysilane, and vinyltriethoxysilane.

For the Y' group and Y" group in the method (ii), various combinations are possible. For example, the Y' group may be an amino group, a hydroxyl group, or a carboxyl group, and the Y" group may be an isocyanato group.

Also, the Y' group may be an allyl group, and the Y" group may be a silicon hydride group (H—Si) as described in JP S62-70405 A, JP H09-272714 A, and JP S59-168014 A. In this case, the Y' group and the Y" group can be bonded through hydrosilylation reaction in the presence of a group VIII transition metal.

Examples of the mercaptan containing a reactive silyl group used as a chain transfer agent in the method (iii) include γ-mercaptopropyltrimethoxysilane, γ-mercaptpropylmethyldimethoxysilane, and γ-mercaptopropyltriethoxysilane. Also, the compounds (r-1) and (r-2) may be copolymerized in the presence of a bifunctional radical polymerizable compound and a mercaptan containing an alkoxysilyl group as a chain transfer agent, as described in JP S60-228516 A.

Examples of the azobisnitrile compound and disulfide compound containing a reactive silyl group in the method (iv) include azobisnitrile compounds containing alkoxysilyl groups and disulfide compounds containing alkoxysilyl groups, as described in JP S60-23405 A, JP S62-70405 A, and the like.

Examples of the method (v) include the methods described in JP H09-272714 A and the like.

In addition, methods using a mercaptan containing a reactive silyl group together with a radical polymerization initiator containing a reactive silyl group, as described in JP S59-168014 A and JP S60-228516 A, may be used.

The (co)polymer (R) may have any number of reactive silyl groups, but preferably has 0.1 or more and 4.0 or less, and more preferably 0.5 or more and 2.0 or less reactive silyl groups per molecule on average, in terms of the cost and the influence on the adhesion.

The proportions of the reactive silyl group-containing organic polymers (P) and (Q) and the (co)polymer (R) in the composition of the present invention are preferably: (R) 5 to 500 parts by weight, more preferably 5 to 300 parts by weight, particularly preferably 5 to 100 parts by weight, and most preferably 5 to 50 parts by weight for each 100 parts by weight in total of (P)+(Q). A proportion of lower than 5 parts by weight may not achieve sufficient effects on the initial tack and final adhesion, while a proportion of 500 parts by weight or more may lead to high viscosity to deteriorate the workability.

The curable composition of the present invention preferably contains a filler (F) for improving the initial tack and increasing the adhesion and mechanical strength of the cured article.

Examples of the filler include reinforcing fillers such as fumed silica, precipitated silica, crystalline silica, fused silica, dolomite, silicic anhydride, hydrous silicic acid, and carbon black; fillers such as heavy calcium carbonate, colloidal calcium carbonate, magnesium carbonate, diatomite, calcined clay, clay, talc, titanium oxide, bentonite, organic bentonite, ferric oxide, fine aluminum powder, flint powder, zinc oxide, activated zinc white, and resin powders such as PVC powder and PMMA powder; and fibrous fillers such as asbestos, fibrous glass, and filaments. If a filler is used, the amount thereof is 1 to 300 parts by weight, preferably 10 to 200 parts by weight, for each 100 parts by weight in total of the reactive silyl group-containing organic polymer (P) and the reactive silyl group-containing organic polymer (Q).

Among these, silica and calcium carbonate are particularly preferred because they are likely to improve the initial tack.

The curable composition of the present invention can optionally contain additives such as a plasticizer, an adhesion-imparting agent, a physical-property modifier, an anti-sagging agent (thixotropic agent), and a stabilizer.

The curable composition of the present invention can contain a plasticizer. A plasticizer enables adjustment of the mechanical properties such as the viscosity and slump properties of the curable composition, and the tensile strength and elongation of the cured article obtained by curing the curable composition. Specific examples of the plasticizer include phthalic acid ester compounds such as dibutyl phthalate, diisononyl phthalate (DINP), diheptyl phthalate, di(2-ethylhexyl)phthalate, diisodecyl phthalate (DIDP), and butyl benzyl phthalate; terephthalic acid ester compounds such as bis(2-ethylhexyl)-1,4-benzenedicarboxylate (specifically, EASTMAN168 (product of EASTMAN CHEMICAL)); non-phthalic ester compounds such as 1,2-cyclohexane dicarboxylic acid diisononyl ester (specifically, Hexamoll DINCH (product of BASF A.G.)); aliphatic polycarboxylic acid ester compounds such as dioctyl adipate, dioctyl sebacate, dibutyl sebacate, diisodecyl succinate, and tributyl acetylcitrate; unsaturated fatty acid ester compounds such as butyl oleate and methyl acetyl ricinoleate; alkyl sulfonic acid phenyl esters (specifically, Mesamoll (product of LANXESS)); phosphoric acid ester compounds such as tricresyl phosphate and tributyl phosphate; trimellitic acid ester compounds; chlorinated paraffin; hydrocarbon oils such as alkyl diphenyl and partially hydrogenated terphenyl; process oil; and epoxy plasticizers such as epoxidized soybean oil and benzyl epoxystearate.

Also, polymer plasticizers can be used. In the case of using a polymer plasticizer, the initial physical properties can be retained for a long period of time compared to the case of using a small-molecular weight plasticizer which does not contain a polymeric component in the molecule. Furthermore, the drying properties (coating properties) of an alkyd coating material applied to the cured article can be improved. Specific examples of the polymer plasticizers include, but not particularly limited to, vinyl polymers obtained by polymerizing vinyl monomers by various methods; esters of polyalkylene glycols, such as diethylene glycol dibenzoate, triethylene glycol dibenzoate, and pentaerythritol ester; polyester plasticizers formed from dibasic acids (e.g. sebacic acid, adipic acid, azelaic acid, phthalic acid) and divalent alcohols (e.g. ethylene glycol, diethylene glycol, triethylene glycol, propylene glycol, dipropylene glycol); polyethers such as polyether polyols (e.g. polyethylene glycol, polypropylene glycol, and polytetramethylene glycol having a number average molecular weight of 500 or more, or even 1000 or more) and derivatives obtained by converting the hydroxyl groups of these polyether polyols into ester groups, ether groups, or the like; polystyrenes such as polystyrene and poly-α-methylstyrene; polybutadiene, polybutene, polyisobutylene, butadiene-acrylonitrile, and polychloroprene.

Among these, polymer plasticizers that are compatible with the reactive silyl group-containing organic polymer (P) and the reactive silyl group-containing organic polymer (Q) are preferred. In this respect, polyethers and vinyl polymers are preferred. Use of polyethers as a plasticizer is preferred because the surface curability and depth curability are improved and curing retardation does not occur after storage. Among these, polypropyrene glycols are more preferred. In terms of compatibility, weather resistance, and heat resistance, vinyl polymers are preferred. Among vinyl polymers, at least one of an acrylic polymer and a methacrylic polymer is preferably used, and an acrylic polymer such as a polyalkyl acrylate ester is more preferably used. The polymer may preferably be synthesized by the living radical polymerization, and more preferably the atom transfer radical polymerization because these methods allow production of a polymer having a low molecular weight distribution and a lower viscosity. Also preferable are polymers produced by what is called an SGO process in which alkyl acrylate ester monomers are continuously bulk-polymerized under high-temperature and high-pressure conditions, as disclosed in JP 2001-207157 A.

The number average molecular weight of the polymer plasticizer is preferably 500 to 15000, more preferably 800 to 10000, still more preferably 1000 to 8000, particularly preferably 1000 to 5000, and most preferably 1000 to 3000. If the molecular weight is too small, the plasticizer exudes due to heat or rain over time, and therefore the initial physical properties cannot be retained for a long period of time. If the molecular weight is too large, the viscosity is high, and thus the workability is deteriorated.

The molecular weight distribution of the polymer plasticizer is not particularly limited, and is preferably as low as less than 1.80, more preferably 1.70 or lower, still more preferably 1.60 or lower, even more preferably 1.50 or lower, particularly preferably 1.40 or lower, and most preferably 1.30 or lower.

The number average molecular weight of the polymer plasticizer is measured by the GPC method in the case of a vinyl polymer, and is measured by terminal analysis in the case of a polyether polymer. Also, the molecular weight distribution (Mw/Mn) thereof is measured by the GPC method (relative to polystyrene standards).

The polymer plasticizer may or may not contain a reactive silyl group. If the polymer plasticizer contains a reactive silyl group, the polymer plasticizer functions as a reactive plasticizer, and thus exudation of the plasticizer from the cured article can be prevented. If the polymer plasticizer contains a reactive silyl group, the number of the reactive silyl groups is preferably 1 or less, more preferably 0.8 or less per molecule on average. If a reactive silyl group-containing plasticizer, particularly a reactive silyl group-containing polyether polymer, is used, the number average molecular weight thereof needs to be smaller than that of the reactive silyl group-containing polymer (P).

The amount of the plasticizer is preferably 5 to 150 parts by weight, preferably 10 to 120 parts by weight, and still more preferably 20 to 100 parts by weight, for each 100 parts by weight in total of the reactive silyl group-containing organic polymer (P) and the reactive silyl group-containing organic polymer (Q). An amount of less than 5 parts by weight may not achieve the effect of the plasticizer, while an amount of more than 150 parts by weight may lead to insufficient mechanical strength of the cured article. The plasticizers may be used alone or in combination. A low-molecular plasticizer and a polymer plasticizer may be used in combination. These plasticizers can be added in production of the polymers.

The curable composition of the present invention can contain a silane coupling agent, a reaction product of a silane coupling agent, or a compound other than a silane coupling agent, as an adhesion-imparting agent. Specific examples of the silane coupling agent include isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, α-isocyanatomethyltrimethoxysilane, and α-isocyanatomethyldimethoxymethylsilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimetoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenyl bis (β-methoxyethoxy)silane, and N-β-(carboxymethyl)aminoethyl-γ-aminopropyltrimethoxysilane; vinyl unsaturated group-containing silanes such as vinyltrimetoxysilane, vinyltriethoxysilane, γ-methacryloyloxypropylmethyldimethoxysilane, and γ-acryloyloxypropylmethyltriethoxysilane; halogen-containing silanes such as γ-chloropropyltrimethoxysilane; and isocyanurate silanes such as tris(t-rimethoxysilyl)isocyanurate. Also, derivatives of these (e.g. amino-modified silyl polymer, silylated amino polymer, unsaturated aminosilane complex, phenylamino long-chain alkyl silane, amino-silylated silicone, silylated polyester) can be used as a silane coupling agent. The silane coupling agent in the present invention is preferably used in an amount of 0.1 to 20 parts by weight, and particularly preferably 0.5 to 10 parts by weight, for each 100 parts by weight in total of the reactive silyl group-containing organic polymer (P) and the reactive silyl group-containing organic polymer (Q).

The curable composition of the present invention may optionally contain an anti-sagging agent to prevent sagging and improve the workability. Examples of the anti-sagging agent include, but not particularly limited to, polyamide waxes; hydrogenated castor oil derivatives; and metal soaps such as calcium stearate, aluminum stearate, and barium stearate. These anti-sagging agents may be used alone or in combination.

The anti-sagging agent is preferably used in an amount of 0.1 to 20 parts by weight for each 100 parts by weight in total of the reactive silyl group-containing organic polymer (P) and the reactive silyl group-containing organic polymer (Q).

The curable composition of the present invention may contain an antioxidant. An antioxidant enhances weather resistance of the cured article. Examples of the antioxidant include hindered phenol antioxidants, monophenol antioxidants, bisphenol antioxidants, and polyphenol antioxidants. Particularly preferable are hindered phenol antioxidants. Similarly, the following hindered amine light stabilizers can be used: Tinuvin 622LD and Tinuvin 144; CHIMASSORB 944LD, CHIMASSORB 119FL (all are products of Ciba Japan K.K.); Adekastab LA-57, Adekastab LA-62, Adekastab LA-67, Adekastab LA-63, and Adekastab LA-68 (all are products of ADEKA CORPORATION); and SANOL LS-770, SANOL LS-765, SANOL LS-292, SANOL LS-2626, SANOL LS-1114, and SANOL LS-744 (all are products of Sankyo Lifetech Co., Ltd.). Specific examples of the antioxidant include ones disclosed in JP H4-283259 A and JP H9-194731 A.

The amount of the antioxidant is preferably 0.1 to 10 parts by weight, and more preferably 0.2 to 5 parts by weight, for each 100 parts by weight in total of the reactive silyl group-containing organic polymer (P) and the reactive silyl group-containing organic polymer (Q).

The curable composition of the present invention may contain a light stabilizer. A light stabilizer enables prevention of photooxidative deterioration of the cured article. Examples of the light stabilizer include benzotriazole compounds, hindered amine compounds, and benzoate compounds. Particularly preferable among these are hindered amine compounds.

The amount of the light stabilizer is preferably 0.1 to 10 parts by weight, and more preferably 0.2 to 5 parts by weight, for each 100 parts by weight in total of the reactive silyl group-containing organic polymer (P) and the reactive silyl group-containing organic polymer (Q). Specific examples of the light stabilizer include those disclosed in JP H9-194731 A.

In the case that the curable composition of the present invention contains a photo-curable substance, particularly an unsaturated acrylic compound, then a tertiary amine-containing hindered amine light stabilizer is preferably used as the hindered amine light stabilizer as described in JP H5-70531 A, in terms of improving the storage stability of the composition. Examples of the tertiary amine-containing hindered amine light stabilizer include Tinuvin 622LD, Tinuvin 144, and CHIMASSORB 119FL (all are products of Ciba Japan K.K.); Adekastab LA-57, LA-62, LA-67, and LA-63 (all are products of ADEKA CORPORATION); and SANOL LS-765, LS-292, LS-2626, LS-1114, and LS-744 (all are products of Sankyo Lifetech Co., Ltd.).

The curable composition of the present invention may contain an ultraviolet absorber. An ultraviolet absorber enables an increase in the surface weather resistance of the cured article. Examples of the ultraviolet absorber include benzophenone compounds, benzotriazole compounds, salicylate compounds, substituted tolyl compounds, and metal chelate compounds. Particularly preferred among these are benzotriazole compounds.

The amount of the ultraviolet absorber is preferably 0.1 to 10 parts by weight, and more preferably 0.2 to 5 parts by weight, for each 100 parts by weight in total of the reactive silyl group-containing organic polymer (P) and the reactive silyl group-containing organic polymer (Q). It is preferable to use a phenol or hindered phenol antioxidant, a hindered amine light stabilizer, and a benzotriazole ultraviolet absorber in combination.

The curable composition of the present invention may optionally contain various additives other than the aforementioned additives for adjustment of the properties of the curable composition or cured article. Examples of the additives include flame retardants, curability modifiers, radical inhibitors, metal deactivators, antiozonants, phosphorus peroxide decomposers, lubricants, pigments, blowing agents, solvents, and antifungal agents. These various additives may be used alone or in combination. Specific examples of the additives other than the ones mentioned herein are described in, for example, JP H4-69659 B, JP H7-108928 B, JP S63-254149 A, JP S64-22904 A, and JP 2001-72854 A.

The curable composition of the present invention can be prepared as a one-pack curable composition which is prepared by compounding all the formulation components and storing the resulting composition in a hermetically closed vessel in advance, and is cured by moisture in the air after application. Alternatively, the curable composition can be prepared as a two-pack curable composition which includes, separately, a polymer composition and a formulation mixture (curing agent) prepared by mixing such components as a curing catalyst, filler, plasticizer, and water, and in which the polymer composition and the formulation mixture are mixed prior to application.

In the case of producing a one-pack curable composition, since all the formulation components are mixed in advance, formulation components containing water are preferably dehydrated and dried prior to compounding or are dehydrated, for example, under reduced pressure during the mixing and kneading. In the case of producing a two-pack curable composition, since a curing catalyst is not required to be mixed in the base mixture including the reactive silyl group-containing organic polymers, the base mixture is less likely to be gelled even if containing a small amount of water; still, if long-term storage stability is required, the formulation components are preferably dehydrated and dried. Preferred examples of the dehydrating and drying method include heat drying in the case that the formulation components are solids such as powder; and vacuum dehydration and dehydration using a substance such as synthetic zeolite, active alumina, or silica gel in the case that the formulation components are liquids. Alternatively, the composition may be mixed with a small amount of an isocyanate compound such that an isocyanato group and water are reacted for dehydration. The storage stability can be further improved by, in addition to performing the dehydration and drying method, adding a lower alcohol such as methanol or ethanol; or an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane.

The amount of a dehydrating agent, particularly a silicon compound reactive with water, such as vinyltrimethoxysilane, is preferably 0.1 to 20 parts by weight, and more preferably 0.5 to 10 parts by weight, for each 100 parts by weight in total of the reactive silyl group-containing organic polymer (P) and the reactive silyl group-containing organic polymer (Q).

The curable composition of the present invention can be used as a sealing material for building purposes or an industrial adhesive. The curable composition can also be used as a sealant for buildings, boats and ships, cars, or roads. Furthermore, the curable composition can be used as a sealing composition or adhesive composition of various kinds because it can closely adhere to a variety of materials such as glass, ceramic, wood, metal, and resin-molded products, singly or together with a primer. The curable composition, if used as an adhesive, is particularly useful as a contact adhesive. Particularly, an adhesive for long vinyl floor sheets is required to have initial tack to restrain the long sheet from peculiarly rolling, and to further retain the tack for a long period of time (100 minutes or longer) if the adhesive is used for a large area. Hence, the curable composition of the present invention is useful. The curable composition is also useful as a food packaging material, a casting rubber material, a material for mold forming, and a coating material.

EXAMPLES

Hereinafter, the present invention is described in more detail based on specific examples which, however, are not intended to limit the scope of the present invention.

Synthesis Example 1

Propylene oxide was polymerized in the presence of butanol as an initiator and a zinc hexacyanocobaltate glyme complex catalyst to give a polyoxypropylene polymer having a number average molecular weight of 28500 (polystyrene-equivalent molecular weight determined with a TOSOH model HLC-8120 GPC solvent delivery system, a TOSOH model TSK-GEL H type column, and THF as a solvent) and having a butoxy group at one terminal and a hydroxyl group at the other terminal. Thereto was added a NaOMe solution in methanol in an amount of 1.2 equivalents relative to the hydroxyl group of the polyoxypropylene polymer, and then the methanol was distilled off. To the residue was added 3-chloro-1-propene, so that each terminal hydroxyl group was converted into an allyl group. Into the produced allyl-monoterminated polyoxypropylene polymer (100 parts by weight), triethoxysilane (TES, 0.82 parts by weight) was gradually dropped with stirring in the presence of a 36 ppm platinum-divinyldisiloxane complex (3% by weight solution in isopropanol in terms of platinum). The mixed solution was reacted at 90° C. for two hours, and unreacted TES was distilled off under reduced pressure. The mixed solution was further mixed with methanol (20 parts by weight) and HCl (12 ppm) so that the terminal ethoxy groups were converted into methoxy groups. Thereby, a reactive silyl group-containing polyoxypropylene polymer (P-1) having a trimethoxysilyl group at one terminal, 0.8 silyl groups per molecule on average, a number average molecular weight of 28800, and an Mw/Mn of 1.3 was obtained.

Synthesis Example 2

Propylene oxide was polymerized in the presence of butanol as an initiator and a zinc hexacyanocobaltate glyme complex catalyst to give a polyoxypropylene polymer having a number average molecular weight of 14000 (calculated in the same manner as in Synthesis Example 1) and having a butoxy group at one terminal and a hydroxyl group at the other terminal. Thereto was added a NaOMe solution in methanol in an amount of 1.2 equivalents relative to the hydroxyl group of the polyoxypropylene polymer, and then the methanol was distilled off. To the residue was added 3-chloro-1-propene, so that each terminal hydroxyl group was converted into an allyl group. Into the produced allyl-monoterminated polyoxypropylene polymer (100 parts by weight), triethoxysilane (TES, 1.65 parts by weight) was gradually dropped with stirring in the presence of a 36 ppm platinum-divinyldisiloxane complex (3% by weight solution in isopropanol in terms of platinum). The mixed solution was reacted at 90° C. for two hours, and unreacted TES was distilled off under reduced pressure. The mixed solution was further mixed with methanol (20 parts by weight) and HCl (12 ppm) so that the terminal ethoxy groups were converted into methoxy groups. Thereby, a reactive silyl group-containing polyoxypropylene polymer (P-2) having a trimethoxysilyl group at one terminal, 0.8 silyl groups per molecule on average, a number average molecular weight of 14400, and an Mw/Mn of 1.2 was obtained.

Synthesis Example 3

Propylene oxide was polymerized in the presence of polyoxypropylenediol having a number average molecular weight of about 2000 as an initiator and a zinc hexacyanocobaltate glyme complex catalyst to give a polyoxypropylene glycol having a number average molecular weight of 28500 (calculated in the same manner as in Synthesis Example 1). Thereto was added a NaOMe solution in methanol in an amount of 1.2 equivalents relative to the hydroxyl group of the hydroxy-terminated polyoxypropylene glycol, and then the methanol was distilled off. To the residue was added 3-chloro-1-propene, so that each terminal hydroxyl group was converted into an allyl group. Into the produced allyl-terminated polyoxypropylene polymer (100 parts by weight), triethoxysilane (TES, 1.31 parts by weight) was gradually dropped with stirring in the presence of a 36 ppm platinum-divinyldisiloxane complex (3% by weight solution in isopropanol in terms of platinum). The mixed solution was reacted at 90° C. for two hours, and unreacted TES was distilled off under reduced pressure. The mixed solution was further mixed with methanol (20 parts by weight) and HCl (12 ppm) so that the terminal ethoxy groups were converted into methoxy groups. Thereby, a reactive silyl group-containing polyoxypropylene polymer (P'-3) containing a terminal trimethoxysilyl group, and having 1.6 silyl groups per molecule on average, a number average molecular weight of 29100, and an Mw/Mn of 1.3 was obtained.

Synthesis Example 4

Propylene oxide was polymerized in the presence of polyoxypropylenediol having a number average molecular weight of about 2000 as an initiator and a zinc hexacyanocobaltate glyme complex catalyst to give a polyoxypropylene glycol having a number average molecular weight of 28500 (calculated in the same manner as in Synthesis Example 1). Thereto was added a NaOMe solution in methanol in an amount of 1.2 equivalents relative to the hydroxyl group of the hydroxy-terminated polyoxypropylene glycol, and then the methanol was distilled off. To the residue was added 3-chloro-1-propene, so that each terminal hydroxyl group was converted into an allyl group. Into the produced allyl-terminated polyoxypropylene polymer (100 parts by weight), triethoxysilane (TES, 0.65 parts by weight) was gradually dropped with stirring in the presence of a 36 ppm platinum-divinyldisiloxane complex (3% by weight solution in isopropanol in terms of platinum). The mixed solution was reacted at 90° C. for two hours, and unreacted TES was distilled off under reduced pressure. The mixed solution was further mixed with methanol (20 parts by weight) and HCl (12 ppm) so that the terminal ethoxy groups were converted into methoxy groups. Thereby, a reactive silyl group-containing polyoxypropylene polymer (P'-4) containing a terminal trimethoxysilyl group, and having 0.8 silyl groups per molecule on average, a number average molecular weight of 29100, and an Mw/Mn of 1.3 was obtained.

Synthesis Example 5

Propylene oxide was polymerized in the presence of polyoxypropylenediol having a molecular weight of about 2000 as an initiator and a zinc hexacyanocobaltate glyme complex catalyst to give a polyoxypropylene glycol having a number average molecular weight of 14000 (calculated in the same manner as in Synthesis Example 1). Thereto was added a NaOMe solution in methanol in an amount of 1.2 equivalents relative to the hydroxyl group of the hydroxy-terminated polyoxypropylene glycol, and then the methanol was distilled off. To the residue was added 3-chloro-1-propene, so that each terminal hydroxyl group was converted into an allyl group. Into the produced allyl-terminated polyoxypropylene polymer (100 parts by weight), methyldimethoxysilane (1.70 parts) was gradually dropped with stirring in the presence of a 72 ppm platinum-divinyldisiloxane complex (3% by weight solution in isopropanol in terms of platinum). The mixed solution was reacted at 90° C. for two hours, and unreacted methyldimethoxysilane was distilled off under reduced pressure. Thereby, a reactive silyl group-containing linear polyoxypropylene polymer (Q-1) containing a terminal methyldimethoxysilyl group, and having 1.6 silyl groups per molecule on average, a number average molecular weight of 14200, and an Mw/Mn of 1.2 was obtained.

Synthesis Example 6

Propylene oxide was polymerized in the presence of polyoxypropylenediol having a molecular weight of about 2000 as an initiator and a zinc hexacyanocobaltate glyme complex catalyst to give a polyoxypropylene glycol having a number average molecular weight of 29000 (calculated in the same manner as in Synthesis Example 1). Thereto was added a NaOMe solution in methanol in an amount of 1.2 equivalents relative to the hydroxyl group of the hydroxy-terminated polyoxypropylene glycol, and then the methanol was distilled off. To the residue was added 3-chloro-1-propene, so that each terminal hydroxyl group was converted into an allyl group. Into the produced allyl-terminated polyoxypropylene polymer (100 parts by weight), methyldimethoxysilane (0.86 parts) was gradually dropped with stirring in the presence of a 72 ppm platinum-divinyldisiloxane complex (3% by weight solution in isopropanol in terms of platinum). The mixed solution was reacted at 90° C. for two hours, and unreacted methyldimethoxysilane was distilled off under reduced pressure. Thereby, a reactive silyl group-containing linear polyoxypropylene polymer (Q-2) containing a terminal methyldimethoxysilyl group, and having 1.6 silyl groups per molecule on average, a number average molecular weight of 29500, and an Mw/Mn of 1.3 was obtained.

Synthesis Example 7

Propylene oxide was polymerized in the presence of polyoxypropylenediol having a molecular weight of about 2000 as an initiator and a zinc hexacyanocobaltate glyme complex catalyst to give a polyoxypropylene glycol having a number average molecular weight of 14000 (calculated in the same manner as in Synthesis Example 1). Thereto was added a NaOMe solution in methanol in an amount of 1.2 equivalents relative to the hydroxyl group of the hydroxy-terminated polyoxypropylene glycol, and then the methanol was distilled off. To the residue was added 3-chloro-1-propene, so that each terminal hydroxyl group was converted into an allyl group. Into the produced allyl-terminated polyoxypropylene polymer (100 parts by weight), methyldimethoxysilane (1.05 parts) was gradually dropped with stirring in the presence of a 72 ppm platinum-divinyldisiloxane complex (3% by weight solution in isopropanol in terms of platinum). The mixed solution was reacted at 90° C. for two hours, and unreacted methyldimethoxysilane was distilled off under reduced pressure. Thereby, a reactive silyl group-containing linear polyoxypropylene polymer (Q-3) containing a terminal methyldimethoxysilyl group, and having 1.0 silyl group per molecule on average, a number average molecular weight of 14200, and an Mw/Mn of 1.2 was obtained.

Synthesis Example 8

Into toluene (40 g) heated to 105° C. were dropped methyl methacrylate (66 g), butyl acrylate (10 g), stearyl methacrylate (15 g), n-dodecyl mercaptan (9 g), and a solution of 2,2'-azobisisobutyronitrile (3 g) in toluene (15 g) as a polymerization initiator, over five hours. The mixture was stirred for two hours. The mixture was further mixed with a solution of 2,2'-azobisisobutyronitrile (0.3 g) in toluene (10 g) with stirring for two hours. Thereby, an acrylic copolymer (R-1) having a solids concentration of 60% by weight, a number average molecular weight of 3000 (polystyrene-equivalent value determined by GPC), and a molecular weight distribution of 1.62 was obtained.

Synthesis Example 9

Into toluene (40 g) heated to 105° C. were dropped methyl methacrylate (67 g), butyl acrylate (5 g), stearyl methacrylate (15 g), 3-methacryloxypropyl methyldimethoxysilane (5 g), γ-mercaptopropylmethyl dimethoxysilane (8 g), and a solution of 2,2'-azobisisobutyronitrile (3 g) in toluene (15 g) as a polymerization initiator, over five hours. The mixture was stirred for two hours. The mixture was further mixed with a solution of 2,2'-azobisisobutyronitrile (0.3 g) in toluene (10 g) with stirring for two hours. Thereby, an acrylic copolymer (R-2) having a solids concentration of 60% by weight, a number average molecular weight of 3000 (polystyrene-equivalent value determined by GPC), and a molecular weight distribution of 1.62 was obtained.

Examples 1 to 7

The polymer (P), the polymer (Q), the polymer (R), WHITON SB, and AEROSIL 200 were mixed in the proportions shown in Table 1 and sufficiently kneaded. The mixture was passed through a three-roll paint mill once for dispersion of the components. The mixture was kneaded for two hours while dehydrated at 120° C. and a reduced pressure of 0.2 mmHg with a planetary mixer. The mixture was cooled to room temperature, and sufficiently mixed with A-171, A-1120, and the curing catalyst (H) in the proportions shown in Table 1. The resulting mixture was defoamed for three minutes under a reduced pressure of 0.2 mmHg, and was put into a moisture resistant cartridge.

(Evaluation)

The viscosity, initial tack, and adhesion of the produced composition were measured by the methods described below.

—Viscosity

The viscosity at 23° C. was measured using a BH viscometer with a No. 7 rotor.

—Initial Tack

* Tack Development Time and Retention Time

The produced composition was applied to a slate sheet using a comb plate, and the state of the composition was checked by fingers at predetermined intervals for measuring the open time. The time at which separation force was felt upon lifting of the fingers from the composition was taken as tack development time. Also, the time during which separation force was present was taken as tack retention time.

* Initial Holding Power (Tack Strength)

The produced composition was applied to a slate sheet using a comb plate, and a vinyl flooring sheet with 200 mm (length)×25 mm (width) (product of Tajima, Inc.; PERMALEUM) was attached to the slate sheet at predetermined intervals for measuring the open time. Here, the vinyl flooring sheet had been rolled around a vinyl chloride pipe (radius: 25 mm) with the back of the sheet faced inside so that the sheet would have a tendency of rolling in that way. After the attachment, the attached sheets were left to stand for a while. The tack strength was evaluated as "C" if the vinyl flooring sheet rolled up and separated from the slate sheet, while the tack strength was evaluated as "A" if the sheet was attached without rolling up.

—Peel Strength

The produced composition was applied to a slate sheet using a comb plate, and an open time was taken until tack was developed. Then, a vinyl flooring sheet with 200 mm (length)×25 mm (width) was attached to the slate sheet. The attached sheets were left to stand at 23° C. for one week, and a tensile test was performed in the 90° C. peeling direction (test speed: 200 mm/min) to determine the adhesion strength.

Comparative Examples 1 to 5

Compositions were produced and evaluated in the same manner as in Examples 1 to 7, except that the polymer (P), the polymer (P'), the polymer (Q), the (co)polymer (R), and the additives were mixed in the proportions shown under the columns of Comparative Examples 1 to 5 in Table 1.

TABLE 1

| | | Molecular weight | Number of silyl groups | Silyl group structure (*1) | Formulation (parts by weight) | | | | | | |
|---|---|---|---|---|---|---|---|---|---|---|---|
| | | | | | Example 1 | Example 2 | Example 3 | Example 4 | Example 5 | Example 6 | Example 7 |
| Polymer (P) | P-1 | 28,800 | 0.8 | TMS (one terminal) | 30 | 30 | 30 | 30 | 30 | 30 | 30 |
| | P-2 | 14,400 | 0.8 | TMS (one terminal) | | | | | | | |
| Polymer (P') | P'-3 | 29,100 | 1.6 | TMS (both terminals) | | | | | | | |
| | P'-4 | 29,100 | 0.8 | TMS (both terminals) | | | | | | | |
| Polymer (Q) | Q-1 | 14,200 | 1.6 | DMS | 70 | 70 | | 70 | 70 | 70 | 70 |
| | Q-2 | 29,500 | 1.6 | DMS | | | | | | | |
| | Q-3 | 14,200 | 1.0 | DMS | | | 70 | | | | |

TABLE 1-continued

| | | Molecular weight | Number of silyl groups | Silyl group structure (*1) | | | | | | | |
|---|---|---|---|---|---|---|---|---|---|---|---|
| (Co)polymer (R) | R-1 | 3,000 | — | — | | | | | | 30 | |
| | R-2 | 3,000 | 2.0 | DMS | | | | | | | 30 |
| Filler | WHITON SB (*2) | | | | 50 | 100 | 100 | 100 | 100 | 100 | 100 |
| | AEROSIL 200 (*3) | | | | | 2 | 2 | 2 | 2 | 2 | 2 |
| Dehydrating agent | A-171 (*4) | | | | 2 | 2 | 2 | 2 | 2 | 2 | 2 |
| Adhesion-imparting agent | A-1120 (*5) | | | | 2 | 2 | 2 | 2 | 2 | 2 | 2 |
| Curing catalyst (H) | Neostann U-100 (*6) | | | | 0.5 | 0.5 | 0.5 | | | 0.5 | 0.5 |
| | DBU (*7) | | | | | | | 2 | | | |
| | 1-o-tolylbiguanide | | | | | | | | 2 | | |
| Viscosity (Pa · s) | | | | | 310 | 500 | 500 | 490 | 500 | 840 | 860 |
| Tack development time (min) | | | | | 10 | 10 | 10 | 15 | 15 | 15 | 15 |
| Initial holding power (tack strength) | | | | | A, B | A | A | A | A | A | A |
| tack retention time (min) | | | | | 10~80 | 10~100 | 10~110 | 15~120 | 15~140 | 15~150 | 15~120 |
| Peel strength (N/25 mm) | | | | | 20 | 30 | 18 | 28 | 32 | 34 | 39 |

| | | Molecular weight | Number of silyl groups | Silyl group structure (*1) | Formulation (parts by weight) | | | | |
|---|---|---|---|---|---|---|---|---|---|
| | | | | | Comparative Example 1 | Comparative Example 2 | Comparative Example 3 | Comparative Example 4 | Comparative Example 5 |
| Polymer (P) | P-1 | 28,800 | 0.8 | TMS (one terminal) | 30 | | 30 | | |
| | P-2 | 14,400 | 0.8 | TMS (one terminal) | | | | 30 | |
| Polymer (P') | P'-3 | 29,100 | 1.6 | TMS (both terminals) | | | | | 30 |
| | P'-4 | 29,100 | 0.8 | TMS (both terminals) | | 30 | | | |
| Polymer (Q) | Q-1 | 14,200 | 1.6 | DMS | | 70 | | | 70 |
| | Q-2 | 29,500 | 1.6 | DMS | 70 | | 70 | 70 | |
| | Q-3 | 14,200 | 1.0 | DMS | | | | | |
| (Co)polymer (R) | R-1 | 3,000 | — | — | | | 30 | 30 | 30 |
| | R-2 | 3,000 | 2.0 | DMS | | | | | |
| Filler | WHITON SB (*2) | | | | 100 | 100 | 100 | 100 | 100 |
| | AEROSIL 200 (*3) | | | | 2 | 2 | 2 | 2 | 2 |
| Dehydrating agent | A-171 (*4) | | | | 2 | 2 | 2 | 2 | 2 |
| Adhesion-imparting agent | A-1120 (*5) | | | | 2 | 2 | 2 | 2 | 2 |
| Curing catalyst (H) | Neostann U-100 (*6) | | | | 0.5 | 0.5 | 0.5 | 0.5 | 0.5 |
| | DBU (*7) | | | | | | | | |
| | 1-o-tolylbiguanide | | | | | | | | |
| Viscosity (Pa · s) | | | | | 1100 | 500 | 2010 | 1240 | 680 |
| Tack development time (min) | | | | | 10 | 10 | 15 | 20 | 10 |
| Initial holding power (tack strength) | | | | | A | A | A | C | A |
| tack retention time (min) | | | | | 10~110 | 10~60 | 15~100 | 20~100 | 10~20 |
| Peel strength (N/25 mm) | | | | | 32 | 30 | 30 | 30 | 39 |

(*1) TMS: trimethoxysilyl group, DMS: methyldimethoxysilyl group
(*2) WHITON SB: heavy calcium carbonate (SHIRAISHI CALCIUM KAISHA, LTD.)
(*3) AEROSIL 200: silica (Nippon Aerosil Co., Ltd.)
(*4) A-171: vinyltrimethoxysilane (Momentive Performance Materials Inc.)
(*5) A-1120: N-(β-aminoethyl)-γ-aminopropyltrimethoxysilane (Momentive Performance Materials Inc.)
(*6) Neostann U-100: dibutyltin dilaurate (Nitto Kasei Co., Ltd.)
(*7) DBU: 1,8-diazabicyclo[5,4,0]undecene-7 (Wako Pure Chemical Industries, Ltd.)

Comparison of the results of the examples and comparative examples in Table 1 shows that the mixtures of the linear organic polymer (P) having a reactive silyl group with a specific structure at only one terminal and the organic polymer (Q) had a high rate of tack development and very long tack retention time. The results also show that they developed tack strength high enough for practical use, low viscosity, and good workability. Also, the polymer combinations other than those in the present invention were found not to have tack strength high enough for practical use, or to have short tack retention time compared to the compositions of the present invention, and also found to have high viscosity and thus poor workability.

INDUSTRIAL APPLICABILITY

The curable composition of the present invention can be used as a sealing material for building purposes or an industrial adhesive. The curable composition can also be used as a sealant for buildings, boats and ships, cars, or roads. Furthermore, the curable composition can be used as a sealing composition or adhesive composition of various kinds because it can closely adhere to a variety of materials such as glass, ceramic, wood, metal, and resin-molded products, singly or together with a primer. The curable composition, if used as an adhesive, is particularly useful as a contact adhesive. The curable composition is also useful as a food packaging material, a casting rubber material, a material for mold forming, and a coating material.

The invention claimed is:
1. A curable composition, comprising
   a linear organic polymer (P) having 0.5 to less than 1.0 reactive silyl groups on average per molecule represented by the following formula (1), and
   an organic polymer (Q) containing a reactive silyl group represented by the following formula (2), the organic polymer (P) and the organic polymer (Q) being mixed at a mixing ratio (P):(Q), in terms of parts by weight, of 60:40 to 5:95, the organic polymer (P) having a number average molecular weight larger than that of the organic polymer (Q), the formula (1) being:

—V—SiX$_3$   (1)

wherein V represents a C1 to C8 divalent hydrocarbon group, Xs each represent a hydroxyl or hydrolyzable group, and when there are a plurality of Xs, Xs may be the same as or different from one another, the formula (2) being:

—V—SiR$^1_d$X$_{3-d}$   (2)

wherein R$^1$ represents a C1 to C20 hydrocarbon group, a C6 to C20 aryl group, a C7 to C20 aralkyl group, or a triorganosiloxy group represented by R$^0_3$SiO— where the three R$^0$s each represent a C1 to C20 hydrocarbon group and may be the same as or different from one another; V represents a C1 to C8 divalent hydrocarbon group; X represents a hydroxyl or hydrolyzable group; d represents 1 or 2; when there are a plurality of R$^1$s, R$^1$s may be the same as or different from one another; and when there are a plurality of Xs, Xs may be the same as or different from one another.

2. The curable composition according to claim 1, wherein a backbone structure of the organic polymer (P) is a polyoxypropylene polymer.

3. The curable composition according to claim 1, wherein a backbone structure of the organic polymer (Q) is a polyoxypropylene polymer.

4. The curable composition according to claim 1, wherein the organic polymer (P) has a number average molecular weight of 10000 or more.

5. The curable composition according to claim 1, wherein the organic polymer (Q) has a number average molecular weight of 20000 or less.

6. The curable composition according to claim 1, wherein the organic polymer (Q) has 1.4 or more reactive silyl groups per molecule on average.

7. The curable composition according to claim 1, further comprising a (meth)acrylic acid alkyl ester (co)polymer (R).

8. The curable composition according to claim 1, comprising an amine compound as a curing catalyst (H).

9. The curable composition according to claim 1, comprising a tin compound as a curing catalyst (H) in an amount of 2 parts by weight or less for each 100 parts by weight in total of the polymers (P) and (Q).

10. The curable composition according to claim 9, wherein the tin curing catalyst (H) is at least one of dibutyltin dilaurate and dioctyltin dilaurate.

11. The curable composition according to claim 1, comprising at least one of silica and calcium carbonate as a filler (F).

12. The curable composition according to claim 2, wherein the organic polymer (P) having a polyoxypropylene polymer backbone structure is formed from a polyoxypropylene polymer polymerized using an initiator that has one hydroxyl group per molecule.

13. A contact adhesive, comprising the curable composition according to claim 1 as a component.

14. The curable composition according to claim 1, wherein the reactive silyl group represented by the formula (2) is —CH$_2$CH$_2$CH$_2$—Si(CH$_3$)(OCH$_3$)$_2$.

15. The curable composition according to claim 1, wherein the organic polymer (P) has a number average molecular weight of 22,000 or more.

* * * * *